United States Patent [19]

Baek

[11] Patent Number: 5,209,260

[45] Date of Patent: May 11, 1993

[54] VALVE UNIT FOR HERMETIC RECIPROCATING TYPE COMPRESSOR

[75] Inventor: Chung-Guk Baek, Seoul, Rep. of Korea

[73] Assignee: Samsung Electronics Co., Ltd., Suweon, Rep. of Korea

[21] Appl. No.: 828,128

[22] Filed: Jan. 30, 1992

[30] Foreign Application Priority Data

Jan. 31, 1991 [KR] Rep. of Korea .................. 91-1471

[51] Int. Cl.⁵ ...................................... F16K 15/03
[52] U.S. Cl. ................................ 137/527; 137/856; 137/857; 417/569
[58] Field of Search ................. 137/527, 857, 856; 417/569

[56] References Cited

U.S. PATENT DOCUMENTS

| | | | |
|---|---|---|---|
| 4,524,806 | 6/1985 | Romer | 137/857 X |
| 4,628,963 | 12/1986 | Ishijima | 137/857 |
| 4,723,896 | 2/1988 | Fritchman | 137/856 X |

FOREIGN PATENT DOCUMENTS 56-143375  9/1981  Japan .

*Primary Examiner*—Robert G. Nilson
*Attorney, Agent, or Firm*—Burns, Doane, Swecker & Mathis

[57] ABSTRACT

A valve unit for a hermetic reciprocating compressor comprises a valve plate adapted to be attached to the end of a piston cylinder. A discharge passage is formed through the valve plate, and a valve assembly is mounted within a stepped recess formed in an outer side of the valve plate for opening and closing the discharge passage. The outlet end of the discharge passage is situated within the recess and is spaced inwardly from the outer side so that the length, and hence the volume, of the discharge passage is reduced. Hence, the amount of compressed gas remaining in the discharge passage at the end of a piston stroke is correspondingly reduced, so that a vacuum can be formed in the piston chamber more quickly as the piston is retracted.

2 Claims, 2 Drawing Sheets

VALVE UNIT FOR HERMETIC RECIPROCATING TYPE COMPRESSOR

FIELD OF THE INVENTION

The present invention relates to a valve unit for a hermetic reciprocating type compressor, and particularly to a compressor valve.

BACKGROUND OF THE INVENTION

There is a conventional valve unit for a hermetic reciprocating type compressor as illustrated in FIG. 1, and this valve unit is constituted as described below. That is, a cylinder head 1' with a discharge room 2' and a suction room (not shown) formed therein is installed on the top of a cylinder 3' in which a piston 4' performs reciprocating movements. Between the cylinder head 1' and the cylinder 3', there is installed a valve plate 10' in which a discharge passage 14' and a suction passage (not shown) are formed. On the top of the valve plate 10', there is installed a discharge valve 23' which performs closing/opening operations in such a manner as to discharge a compressed high pressure refrigerant gas during the elevation of the piston 4'. On the top of the discharge valve 23', there is installed a bending valve 22' which defines the closing/opening range of the discharge valve 23'. On the top of the bending valve 22', there is installed a stopper member 21' which regulates the operating ranges of the discharge and bending valves 23' and 22'.

The discharge valve 23', the bending valve 22' and the stopper member 21' are supported by guide pins 30', while, between the valve plate 10' and the cylinder 3', there is installed an elastic member 6A' having a suction valve 6' which is opened by a vacuum formed within the cylinder 3' during the time when the piston 4' moves from the upper dead point toward the lower dead point, i.e., during the suction stroke.

However, in the above described conventional valve unit for the hermetic reciprocating type compressor, when the piston 4' moves toward the lower dead point after the discharge valve 23' is closed at the upper dead point, a large amount of high compressed refrigerant gas remains within the discharge channel 14' after the closing of the discharge valve 23', so the formation of the vacuum state is delayed. Consequently, the suction valve 6' can not operate in an efficient manner, and therefore, a satisfactorily large amount of lower pressure refrigerant gas can not be sucked into the cylinder 3', with the result that the compressing efficiency is lowered.

Japanese Laid-Open Patent No. SHO 56-143375 discloses another hermetic reciprocating type compressor which has the same shortcoming as that described above, but which also describes a piston-drive mechanism. This compressor consists of a lower portion of vibrating elements and an upper portion of compressing elements. A connecting rod and a piston of the compressing elements are connected together by means of a ball joint, and a larger end of the connecting rod is fitted with a crank pin which is formed on the upper end of a driving shaft, while the driving shaft also serves as an eccentric oil supply pump. A partially cylindrical oil injecting member is installed at the end of the crank pin which is fitted with the large end of the connecting rod. The end of the oil injecting member is disposed axially inwardly relative to the end of the crank pin, while an oil supply hole which leads to the eccentric oil supply pump of the driving shaft is formed on the portion where the crank pin and the large end of the connecting rod are joined together. There are formed a plurality of oil injecting holes on the piston shaft in the radial direction. On the joining portion between the crank pin and the connecting rod, there is formed an oil channel for connecting the oil supply hole and the oil injecting holes.

In the above described hermetic reciprocating type compressor, an oil supplying mechanism is formed on the peak of the crank pin, so that the oil flow should be made constant, and all of the flowing oil should be supplied to the piston thereby providing a lubrication of the ball joint, reducing the friction loss to a significant degree, and improving the compressing efficiency. Further, owing to the cooling effect of the oil, the gas within the cylinder is compressed at a uniform temperature, thereby improving the compressing efficiency in an indirect manner. Further the oil which is supplied from the large end of the connecting rod is injected directly through the oil injecting holes of the relief portion of the crank pin to the wall of the hermetic container, and therefore, the temperature of the contained gas can be maintained at a low level.

However, when the piston moves toward the lower dead point after the closing of the valve at the upper dead point, an excessively large amount of high pressure refrigerant gas remains within the discharge passage after the closing of the discharge valve, and therefore, the formation of vacuum within the cylinder is delayed for the reasons noted earlier with respect to the apparatus of FIG. 1. Accordingly, the suction valve can not operate in an efficient way, so that it should be impossible to suck a large amount of low pressure refrigerant into the cylinder, thereby aggravating the compressing efficiency.

SUMMARY OF A PREFERRED EMBODIMENT OF THE INVENTION

Thee present invention is intended to overcome the above described disadvantages of the conventional techniques.

Therefore is an object of the present invention to provide a valve unit for a sealed or hermetic reciprocating type compressor, in which the volume of the discharge passage formed on the valve plate is reduced to a minimum, so that the amount of the high pressure refrigerant gas remaining within the passage should be reduced to the minimum. Hence, the formation of a vacuum within the cylinder should be speedy during the movement of the piston from the upper dead point to the lower dead point, whereby a suction valve should be more quickly open to enable a larger amount of low pressure refrigerant gas to be sucked in, thereby improving the compressing efficiency.

In achieving the above object, the valve unit for a hermetic reciprocating type compressor according to the present invention includes a recess in which the valving is disposed, so that the discharge passage is of less volume. More particularly, the valve unit includes: a valve plate provided with a discharge passage; a discharge valve for being closed/opened in order to discharge high pressure refrigerant gas; a bending spring for defining the closing/opening range of the discharge valve; and a stopper member for regulating the operating ranges of the discharge and bending valves.

In achieving the above object, the valve unit of the present invention further includes: a first accommodating portion for accommodating the stopper member on the top of the valve plate; a second accommodating portion for accommodating the bending spring and the discharge valve under the first accommodating portion; a supporting space formed under the second accommodating portion so as for the discharge valve to be closed/opened in an efficient manner; and a discharge passage formed along the middle line of the supporting space and projected to the same height as that of the second accommodating portion.

Thus the volume of the discharge passage which is formed on the valve plate is minimized, so that the residue high pressure refrigerant gas remaining within the discharge passage should be minimized, that vacuum should be speedily formed within the cylinder during the movement of the piston from the upper dead point to the lower dead point, that the valve should be closed/opened in an efficient manner, and that a larger amount of low pressure refrigerant gas should be sucked in, thereby improving the compressing efficiency.

BRIEF DESCRIPTION OF THE DRAWINGS

The above object and other advantages of the present invent ion will become more apparent by describing in detail the preferred embodiment of the present invention with reference to the attached drawings in which.

DESCRIPTION OF THE PREFERRED EMBODIMENT

Figure 1:
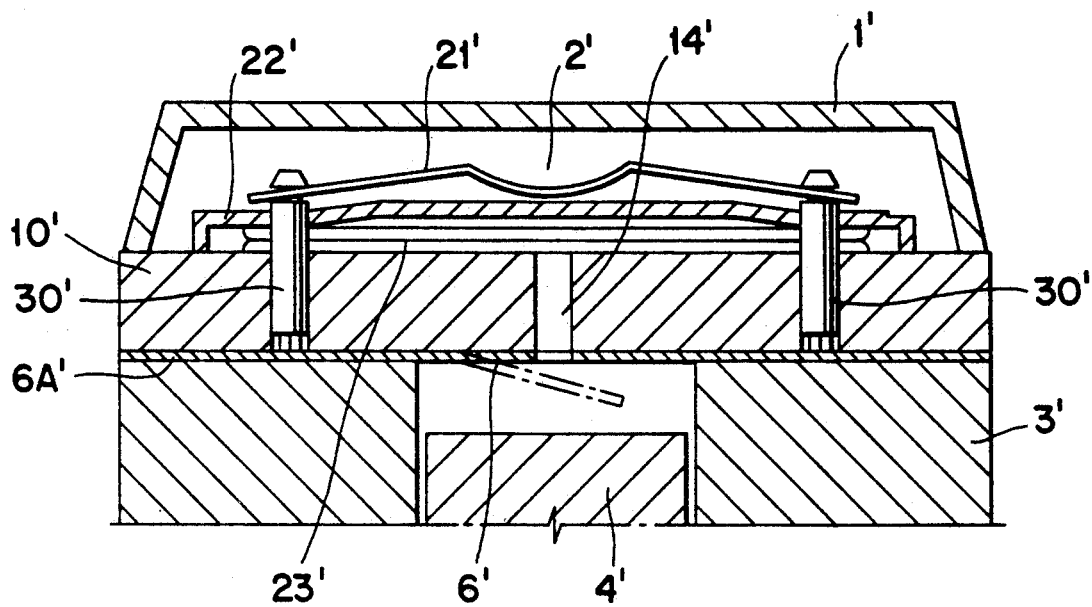
FIG. 1 is a sectional view showing the constitution of a conventional valve unit for hermetic reciprocating type compressor.
Figure 2:
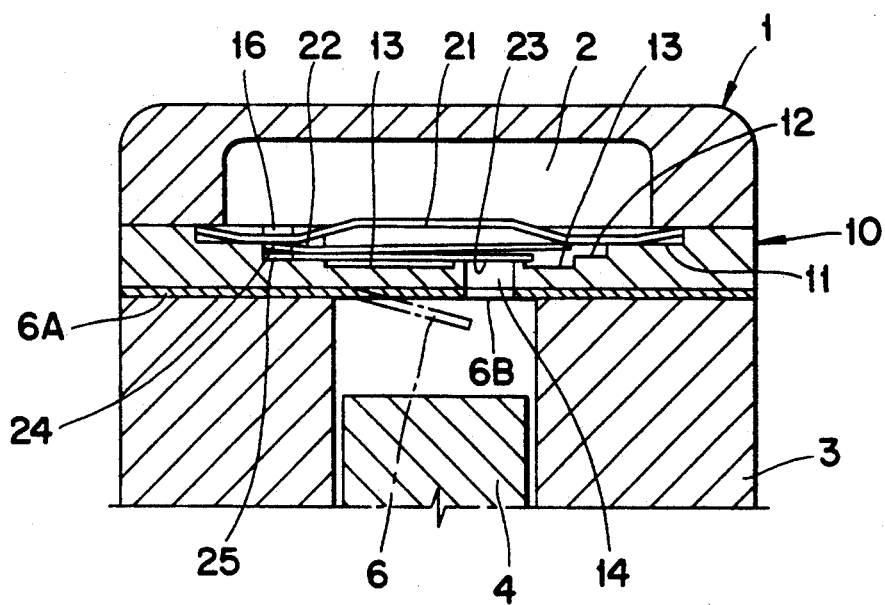
FIG. 2 is a sectional view showing the constitution of the valve unit for the hermetic reciprocating type compressor according to the present invention.
Figure 3:
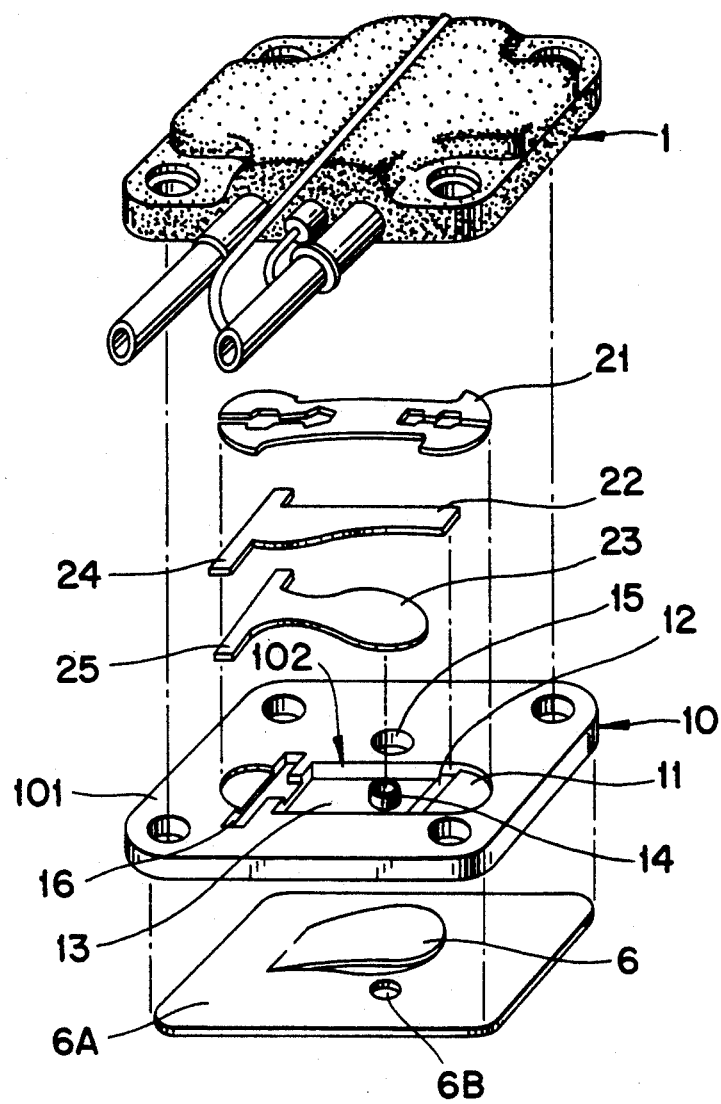
FIG. 3 is an exploded perspective view showing in detail the constitution of the valve unit of the hermetic reciprocating type compressor according to the present invention.
Figure 4:
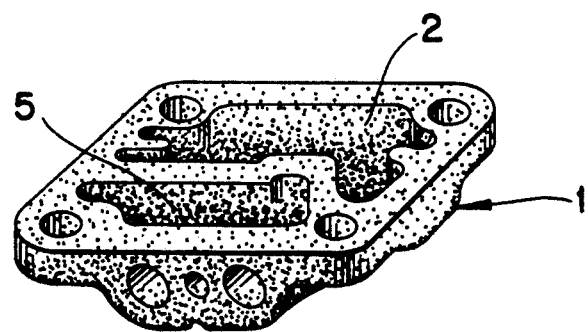
FIG. 4 is a perspective view showing the rear portion of the cylinder head for use on the compressor of the present invention.

Referring to FIGS. 2 to 4, reference numeral 1 indicates a cylinder head, and a discharge room 2 and a suction room 5 are formed under the cylinder head 1. Under them, there is formed a cylinder 3, having a piston 4, which performs reciprocating movements within the cylinder 3 for introducing and compressing low pressure refrigerant gas. A gas inlet passage 15 is formed between the cylinder head 1 and the cylinder 3.

On the top outer side 101 of the valve plate 10, there is provided a stepped recess 102 which includes a first accommodating portion having an outer surface 11 in which a stopper member 21 is accommodated, and the stopper member 21 retains a discharge valve 23 and a bending spring 22 in the recess 102. Under or inwardly of the outer surface 11 the recess is stepped to form a second accommodating portion for accommodating the discharge valve 23 and the bending spring 22, and the discharge valve 23 performs closing/opening operations in order to discharge the refrigerant gas, while the bending spring 22 restricts the closing/opening range of the discharge valve 23. The second accommodating portion includes an inner surface 12 against which the discharge valve bears.

Further, as shown in FIG. 3, projecting tab portions 25 and 24 project laterally from one end each of the discharge valve 23 and the bending spring 22, and the inner surface 12 of the second accommodating portion further includes a supporting portion 16 by which the projecting portions 25 and 24 (projected from the discharge and members 23 and 22) are conveniently supported.

The projecting portions 25 and 24 of the discharge valve 23 and the bending spring 22 are supported by the supporting portions 16 and are pressed by the stopper member 21, and therefore, the operations of the discharge valve 23 and the bending spring 22 are regulated at a certain range within the second accommodating portion. Under or inwardly of the second accommodating portion 12 there is formed a supporting space 13 in such a manner that the discharge valve 23 should be efficiently closed/opened during the movement of the piston 4 from the lower dead point to the upper dead point. Through the middle portion of the supporting space 13, there is formed a discharge passage 14, so that the high pressure refrigerant gas should be discharged during the movement of the piston from the lower dead point to the upper or outlet dead point. The upper end of the discharge passage 14 has the same height as that of the inner surface 12, i.e., is coplanar therewith, so that the discharge valve 23 should be able to efficiently close/open the discharge passage 14.

In the drawings, reference numeral 6A indicates an elastic member having a suction or reed 6 which is opened upon the formation of vacuum within the cylinder 3, as the piston moves from the upper dead point to the lower dead point. The reed 6 opens the gas inlet passage 15.

The device of the present invention constituted as described above will now be described as to its operation and effects.

As shown in FIGS. 2 to 4, the height of the discharge passage 14 is less than a height lower than of the valve plate 10, and has the same height as that of the second accommodating portion 12, with the result that the volume of the discharge passage 14 can be reduced to a minimum. That is, when the piston 4 arrives at the upper dead point, and the discharge valve 23 is closed, the residue high pressure refrigerant gas remaining within the discharge passage 14 can be minimized, and therefore, when the piston 4 moves from the upper dead point to the lower dead point (i.e., during the suction stroke), vacuum is speedily formed within the cylinder 3, with the result that the reed 6 opens the passage 15 in an efficient manner, and that a larger amount of low pressure refrigerant gas can be sucked in, thereby improving the compressing efficiency.

According to the valve unit of the hermetic reciprocating type compressor of the present invention as described above, the volume of the discharge passage formed in the valve plate is minimized, so that the amount of the residue high pressure refrigerant gas remaining within the the discharge passage can be minimized, and that vacuum can be speedily formed during the movement of the piston from the upper dead point to the lower dead point within the cylinder. Consequently, the suction valve operates efficiently, and a larger amount of low pressure refrigerant gas can be sucked in, thereby improving the compressing efficiency of the compressor.

What is claimed is:

1. A valve unit for a hermetic reciprocating compressor, comprising:
   a rigid cylinder,
   a rigid cylinder head,
   a valve plate disposed between said cylinder and cylinder head, said valve plate having inner and outer sides facing said cylinder and cylinder head, respectively, a stepped recess formed in said outer side and including first and second steps defining first and second accommodating portions, respectively, of which said second accommodating portion being disposed at a greater depth in said recess than said first accommodating portion, said recess including a supporting space disposed at a greater depth than said second accommodating portion,
   a discharge passage extending through said valve plate from said first side to said second side and having an outlet end protruding into said supporting space,
   a discharge valve including a first end portion abutting said outlet end of said discharge passage for closing the latter, and a second end portion disposed in said second accommodating portion, said second end including a lateral tab projecting into a supporting portion of said recess,
   a bending spring overlying said discharge valve and including a first end portion biasing the latter to a closed position against said outlet end, and a second end portion disposed in said second accommodating portion, said second end including a lateral tab projecting into said supporting portion of said recess, and
   a stopper member overlying said bending spring for retaining said bending spring and said discharge valve in said second accommodating portion, said stopper member including opposing ends disposed in said first accommodating portion,
   portions of said cylinder head being arranged to overlie said first accommodating portion for engaging said opposing ends of said stopper member to retain said stopper member in said first accommodating portion.

2. Apparatus according to claim 1, wherein said outlet end of said discharge passage is disposed at a greater depth in said recess than said first stepped portion.

* * * * *